Figure 2:
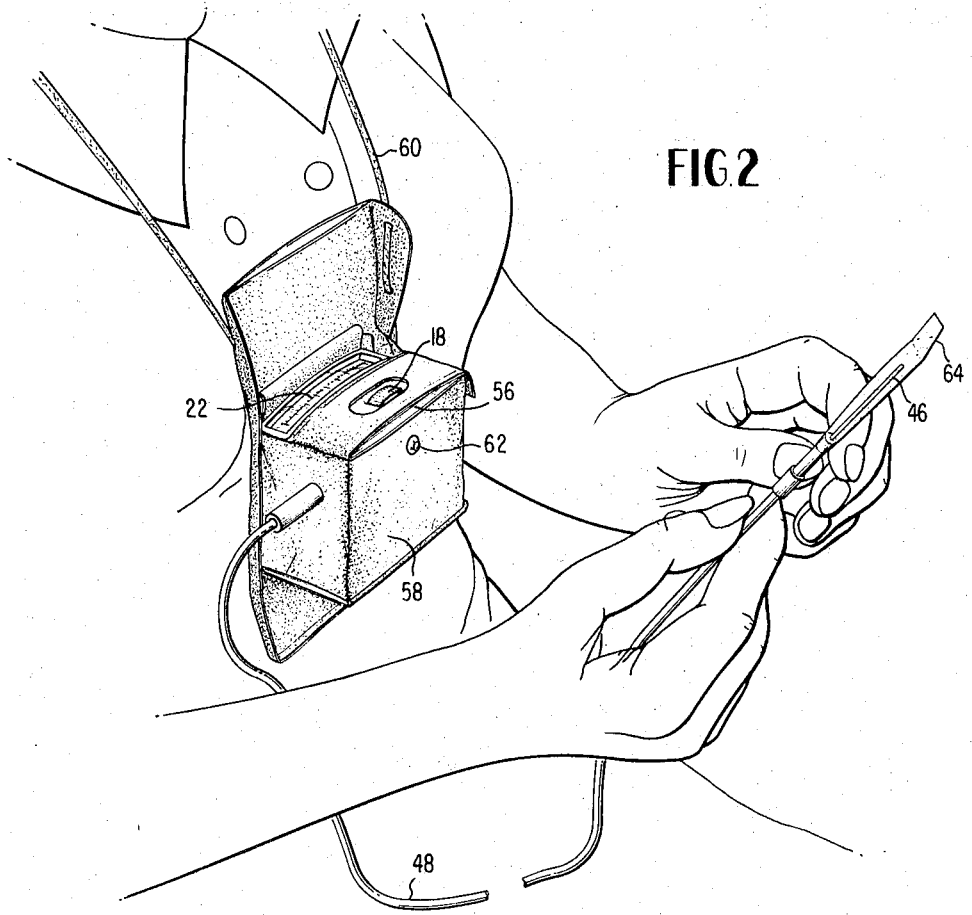

April 16, 1968 P. GHEORGHIU 3,377,862

ELECTRONIC CLINICAL THERMOMETER

Filed March 4, 1966

INVENTOR
PAUL GHEORGHIU

BY *Lindsey, Prutzman and Hayes*

ATTORNEYS

United States Patent Office 3,377,862
Patented Apr. 16, 1968

3,377,862
ELECTRONIC CLINICAL THERMOMETER
Paul Gheorghiu, East Windsor, Conn., assignor to Hi-G Incorporated, Windsor Locks, Conn., a corporation of Connecticut
Filed Mar. 4, 1966, Ser. No. 531,937
5 Claims. (Cl. 73—362)

This invention relates in general to a temperature measuring instrument, and more particularly to a novel electronic clinical thermometer characterized by extreme accuracy, ease of operation and adaptability for a wide range of uses.

It is a primary object of this invention to provide an electronic thermometer particularly, although by no means exclusively, adapted to be used in a clinical environment for the measurement of human body temperatures.

It is a further object of this invention to provide a novel electronic thermometer having a relatively simple and flexible circuit configuration and which is highly reliable, compact and rugged.

It is a further object of this invention to provide such a thermometer which employs passive electrical components to avoid drift problems and the necessity for periodic internal aging adjustment including a thermistor sensing element and a Wheatstone bridge circuit for measuring the resistance of same as a function of temperature.

It is a further object of this invention to provide such a thermometer characterized by a single control means for both on-off switching, battery checking and calibration and which has a high input impedance and output voltage level. The high impedance feature permits the use of a relatively long connecting cable between the sensor and the bridge without loss of accuracy, while the high output level enables the bridge to directly drive an indicating and/or recording device without intermediate amplification.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 1:
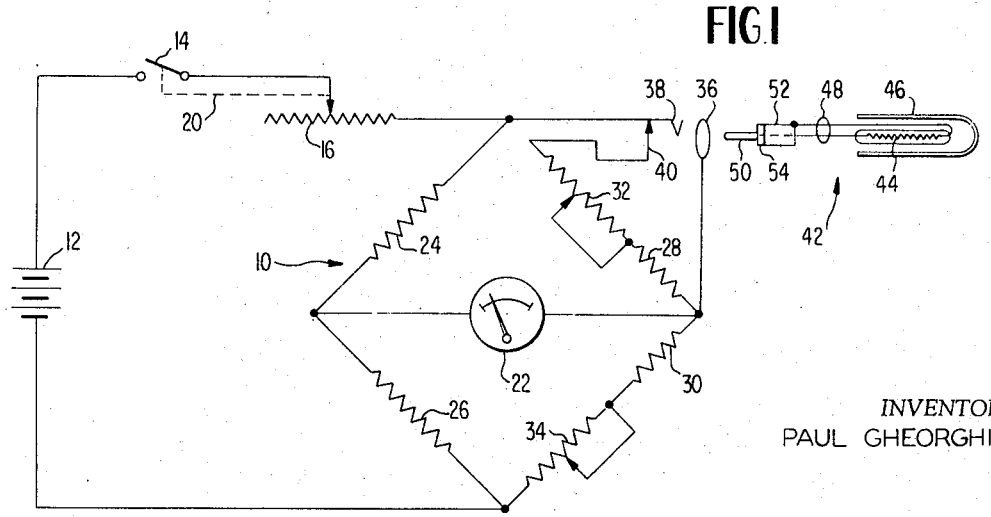

In the drawing:

FIGURE 1 shows a schematic circuit diagram of an electronic thermometer constructed in accordance with the teachings of this invention, and FIGURE 2 shows an isometric view of the actual instrument form, including the circuit and indicator housing, the sensing probe and the connecting cable.

Referring now to the drawings, FIGURE 1 shows a Wheatstone bridge circuit generally indicated by reference numeral 10 energized from a D.C source 12, such as a long life mercury battery, connected across one diagonal of the bridge through a single pole single throw on-off switch 14 and an external calibrating potentiometer 16. The switch and the potentiometer are both controlled by the single knurled knob 18 in FIGURE 2, as indicated by the broken line connection 20 in FIGURE 1. A D'Arsonval type meter 22 is connected across the other diagonal of the bridge 10 to indicate the extent of the unbalance as a representation of the temperature being sensed. The meter scale, as shown in FIGURE 2, spans the entire instrument face to facilitate readout.

The four legs of the bridge circuit contain fixed resistances 24, 26, 28 and 30, and in addition two of the adjacent legs contain potentiometers 32 and 34 in series with resistors 28 and 30, respectively. These potentiometers serve to establish calibration points for the instrument, as more fully described below. The parameters of the bridge components are chosen to effect a high input impedance and a high output voltage level, for the reasons given above.

A jack connector for the sensing probe including a stationary outer contact 36 and a spring-biased inner contact 38 is connected across the bridge leg containing resistor 28 and potentiometer 32. The arrangement is such that when the sensing probe is not plugged into the jack connector a circuit is completed for the one leg of the bridge through an arm terminal 40 and the inner contact 38, thus rendering the bridge circuit operable when energized for purposes of calibration.

The sensing probe assembly, generally indicated by reference numeral 42, comprises a thermistor 44 inserted within a stainless steel sheath 46, a low impedance connecting cable 48 and a jack plug including an inner pin conductor 50, an outer ring conductor 52 and an insulating spacer 54. In its true form, as shown in FIGURE 2, the electrical bridge circuit 10, the battery 12 and the meter 22 are contained in a unitary housing 56 which is lightweight and compact to facilitate use and handling. For purposes of appearance and protection, the housing itself may be carried in a leather-like case 58 provided with a neck strap 60, a snap closure 62 and the necessary openings to permit access to the meter scale, the switch knob and the jack connector. The sheath 46 is sterilized and packaged in a hermetically sealed plastic or cellophane wrapper 64 which is removed and discarded after use.

In operation, the switch 14 is first closed by rotating the knob 18, with the probe assembly unplugged. The knob is then further rotated until the meter needle becomes aligned with a calibration mark on the scale. If the knob is rotated to its limit, corresponding to a movement of the slider for potentiometer 16 to the extreme right, and the meter needle is still unable to align itself with the calibration mark, then the battery 12 is known to have decayed to an inoperable level and it must be replaced.

Assuming that the battery is good and the external calibration described above has been made, the jack plug is now inserted into the connector. As this is being done, pin 50 engages inner contact 38, camming it away from arm terminal 40, and ring 52 engages outer contact 36. This effectively removes resistor 28 and potentiometer 32 from the circuit and substitutes therefor thermistor 44. The impedance of cable 48 is so low compared to that of the thermistor that it may be ignored. The sheath 64 is then applied to the patient either orally, rectally or against the skin. As heat from the patient is conducted through the thin sheath and into the thermistor, the resistance of the latter changes in proportion to the temperature change which in turn alters the bridge output and the meter indication. Due to the high input impedance of the bridge, the thermistor draws very little current, and the self-heating due to such current is therefore negligible. When the temperature of the thermistor stabilizes at the temperature of the patient, which normally occurs in a matter of seconds owing to the small heat capacity of the stainless steel sheath and its high coefficient of thermal conductivity, the patient's temperature may be read directly from the meter scale. As an alternative, the bridge output may be directly connected to an external recording device to permanently record the measured temperature.

The actual probe tip configuration, including the thermistor and sheath, need not be rod-like as shown but may have any desired form, such as disc-shaped for the more effective measurement of skin temperatures. In addition, while basically intended for the measurement of human temperatures, the range of the instrument may be widely varied by internally adjusting the potentiometers 32 and 34. This renders the instrument adaptable to a wide number of medical uses, such as veterinary and hypothermia applications, and also to nonmedical uses, such as industrial application and corrosive atmosphere environments. When the potentiometers are adjusted to change the measuring range, the indicator scale must, of course, also be changed.

As will be apparent to persons skilled in the art, various modifications and adaptations of the structure above described will become readily apparent without departing from the spirit and scope of the invention, the scope of which is defined in the appended claims.

I claim:
1. An electronic thermometer comprising:
    (a) a bridge circuit having four resistive legs and diagonally opposed input and output terminals,
    (b) a D.C. power source,
    (c) means connecting the power source across the bridge input terminals including the series combination of an on-off switch and a first potentiometer ganged for operation by a single control device,
    (d) readout means connected across the bridge output terminals,
    (e) receptacle means connected across one of the bridge legs including movable contact means arranged to normally complete the bridge circuit through the resistance of said one leg, and
    (f) a probe assembly including a plug means adapted to cooperate with the receptacle means, a thermistor and a cable connecting the plug means and the thermistor, whereby when the plug means is inserted into the receptacle means the movable contact means opens the circuit path through the resistance of said one leg and the thermistor is substituted therefor.

2. An electronic thermometer as defined in claim 1 further comprising a thin walled metallic sheath surrounding the thermistor characterized by a relatively high coefficient of thermal conductivity.

3. An electronic thermometer as defined in claim 1 further comprising second and third potentiometers individually connected in series in said one leg and an adjacent leg for calibration of the thermometer.

4. An electronic thermometer as defined in claim 2 further comprising second and third potentiometers individually connected in series in said one leg and an adjacent leg for calibration of the thermometer.

5. An electronic thermometer as defined in claim 1 wherein the readout means is an indicating meter.

References Cited

UNITED STATES PATENTS

| | | | |
|---|---|---|---|
| 2,938,385 | 5/1960 | Mack et al. | 73—362 |
| 2,971,379 | 2/1961 | Weisheit | 73—362 |
| 3,087,338 | 4/1963 | Horbinski et al. | 73—362 |
| 3,165,929 | 1/1965 | Noller | 73—362 |
| 3,221,555 | 12/1965 | Biber | 73—362 |

LOUIS R. PRINCE, *Primary Examiner.*

F. SHOON, *Assistant Examiner.*